United States Patent
Kim et al.

(10) Patent No.: US 9,258,553 B2
(45) Date of Patent: Feb. 9, 2016

(54) MULTI-VIEW DISPLAY DEVICE

(75) Inventors: Jin-Soo Kim, Asan-si (KR); Jae Ho Choi, Seongnam-si (KR); Bo-Ram Kim, Seoul (KR); Myoung-Chul Kim, Suwon-si (KR); Young-Su Han, Incheon (KR); Jong-Yoon Lee, Ansan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 968 days.

(21) Appl. No.: 13/352,485

(22) Filed: Jan. 18, 2012

(65) Prior Publication Data

US 2013/0038602 A1 Feb. 14, 2013

(30) Foreign Application Priority Data

Aug. 11, 2011 (KR) ........................ 10-2011-0080327

(51) Int. Cl.
*H04N 13/04* (2006.01)

(52) U.S. Cl.
CPC ......... *H04N 13/0438* (2013.01); *H04N 13/045* (2013.01); *H04N 2013/0461* (2013.01)

(58) Field of Classification Search
CPC .................. H04N 13/0438; H04N 2013/0461; H04N 13/45
See application file for complete search history.

(56) References Cited

U.S. PATENT DOCUMENTS

| 6,535,241 | B1 | 3/2003 | McDowall et al. | |
|---|---|---|---|---|
| 6,924,833 | B1 | 8/2005 | McDowall et al. | |
| 7,808,449 | B2 | 10/2010 | Neidrich et al. | |
| 2001/0024566 | A1* | 9/2001 | Mankovitz | 386/83 |
| 2009/0079941 | A1 | 3/2009 | Miller et al. | |
| 2010/0007582 | A1* | 1/2010 | Zalewski | 345/8 |
| 2011/0285829 | A1* | 11/2011 | Mori et al. | 348/53 |

FOREIGN PATENT DOCUMENTS

| JP | 2002-010300 | 1/2002 |
|---|---|---|
| JP | 2003-202827 | 7/2003 |
| JP | 2010-062767 | 3/2010 |
| JP | 2010-211177 | 9/2010 |
| KR | 1020020028167 | 4/2002 |
| KR | 1020100105067 | 9/2010 |
| KR | 101008687 | 1/2011 |

* cited by examiner

*Primary Examiner* — Tat Chio
(74) *Attorney, Agent, or Firm* — F. Chau & Associates, LLC

(57) ABSTRACT

A multi-view display device display images based on received image signals, received request signals, and transmits timing control signals. When the device receives request signals with distinct channel information during a given period, the device displays a first image signal and transmits a first timing control signal that includes one of the distinct channel information during a first period of an image frame, and displays a second image signal and transmits a second timing control signal that includes the other of the distinct channel information during another second period of the image frame. User controllers having glasses are activated or deactivated to view or obscure the displayed images based on receipt of the timing control signals.

12 Claims, 13 Drawing Sheets

MULTI-VIEW DISPLAY DEVICE

CROSS-REFERENCE TO RELATED APPLICATION

This application claims priority to Korean Patent Application No. 10-2011-0080327 filed in the Korean Intellectual Property Office on Aug. 11, 2011, the disclosure of which is incorporated by reference herein.

BACKGROUND (a) Technical Field

Embodiments of the present invention relate to a multi-view display device, and more particularly, to a multi-view display device capable of displaying distinct images to a plurality of users.

(b) Discussion of Related Art 3D images can be displayed by using a display device that displays 2D images. For example, different 2D images are seen by the left eye and the right eye of a user, and as a result, 3D images can be perceived due to binocular parallax.

3D images can be perceived from a display device that displays 2D images using special glasses. For example, the glasses enable a user to perceive 3D images by using a vibration direction or a rotation direction of polarization, by alternately displaying left and right images, or by transmitting images having different brightness to the left eye and the right eye.

However, it can be difficult for several users to watch desired images by using one display device. For example, several users using one display device cannot simultaneously view different images.

SUMMARY

At least one embodiment of the present invention has been made in an effort to provide a display device that can display both a 2D image and a 3D image and which displays different images to different viewers by using one display device. Further, at least one embodiment of the present invention has been made in an effort to provide a display device that protects privacy by preventing viewers from watching images that should only be viewable by an authorized viewer.

An exemplary embodiment of the present invention provides a multi-view image display device including a user controller, a display panel, and a signal controller. The user controller includes a user control signal transmitting unit and a user control signal receiving unit. The display panel includes a signal receiving unit and a signal transmitting unit. The signal controller controls the display panel and the user controller. The user controller transmits and receives a user control signal for controlling at least one of a plurality of users.

The user controller may transmit the user control signal through the user control signal transmitting unit. The display panel may receive the user control signal and transmit the user control signal to the signal controller. The signal controller may control the display panel to display an image in one of a plurality of channels according to the user control signal. The signal controller may transmit an image control signal including time information displaying the image to the one channel to the user controller.

The user controller may transmit the user control signal including ID information identifying at least one of the plurality of users to the display panel. The ID information may be distinguished by the duration (e.g., pulse width) of the user control signal. The ID information may be distinguished by the number of transmission times (e.g., number of pulses sent during a given period) of the user control signal. The ID information may be distinguished by the bit pattern of a binary signal of the user control signal.

The plurality of channels may be time-divided to display different images.

The user controller may receive the image control signal through the user control signal receiving unit to be controlled to watch the channel while an image is displayed in one channel.

Each of the plurality of users may have one user controller. The user controller may have one or more switches and the plurality of users may be distinguished from one another from the settings of the switches of the user controllers.

The user control signal may include information to select one of a 2D image signal and a 3D image signal.

According to an exemplary embodiment of the present invention, a display device assigns IDs for each user controller, distinguishes among the user controllers using the user IDs, displays images at different times according to the IDs, and operates polarized glasses of each user controller according to the IDs, such that a plurality of users can watch different desired images by using one display device. Further, the display device may be operated such that one user controller cannot watch the images watched by another user controller to protect privacy.

A multi-view display device according to an exemplary embodiment of the invention includes a display panel, a signal receiving unit, a signal transmitting unit, and a signal controller. The display panel is configured to display images based on received image signals. The signal receiving unit is configured to receive request signals including channel information. The signal transmitting unit is configured to transmit timing control signals. The signal controller is configured to receive the request signals from the signal receiving unit and output the image signals to the display panel. When the signal controller receives at least two of the request signals with distinct channel information during a given period, the signal controller outputs a first image signal to the display panel and a first timing control signal to the signal transmitting unit that includes one of the distinct channel information during a first period of an image frame, and outputs a second image signal to the display panel and a second timing control signal to the signal transmitting unit that includes the other of the distinct channel information during another second period of the image frame. The signal receiving unit and the signal transmitting unit may be both located within the display panel.

The multi-view display device may include a user controller that has polarized glasses, a second signal transmitter to transmit one of the two request signals, and a second signal receiver configured to receive the timing control signals. The user controller may be configured to activate the polarized glasses during one of the two periods to view the display panel and deactivate the polarized glasses to prevent viewing of the display panel during the other period based on the received timing control signals.

The channel information may be identification ID information that distinguishes the user controller from another same second user controller. The ID information of the user controller may be a first pulse width in one of the two request signals, the ID information of the second user controller may be a second pulse width in the other of the two request signals, and the first and second pulse widths may differ from one another.

The ID information of the user controller may be a first number of pulses in one of the two request signals, the ID information of the second user controller may be a second number of pulses in the other of the two request signals, and the first and second numbers may differ from one another.

The ID information of the user controller may be a first bit pattern in one of the two request signals, the ID information of the second controller may be a second bit pattern in the other of the two request signals, and the first and second bit patterns may differ from one another.

Each user controller may have a switching circuit and a setting of each switching circuit may correspond to the respective ID information. Each switching circuit may include a number of selectable buttons, where the selections of the buttons correspond to the respective ID information.

The user controller may be configured to send a determination signal through the second signal transmitting unit that indicates a request for one of a 2D image and a 3D image. The signal receiving unit may receive the determination signal and forward the determination signal to the signal controller. The signal controller may format the image signals sent to the display panel as 2D image signals when the received determination signal indicates a request for a 2D image and format the images signals as 3D images when the received determination signal indicates a request for a 3D image.

According to an exemplary embodiment of the present invention, a multi-view display device includes a first user controller, a second user controller, a display panel, and a signal controller. The first user controller stores a first user identification ID, has glasses with shutters, and is configured to transmit a first request signal including the first user ID. The second user controller stores a second user ID, has glasses with shutters, and is configured to transmit a second request signal including the second user ID. The display panel is configured to display images based on received image signals. The signal controller is configured to receive the request signals, output an image signal to the display panel and a timing control signal including a selected one of the user IDs to the first and second user controllers during a first period of an image frame period. Each user controller closes its respective shutters when it receives the timing signal with the selected user ID that differs from its stored user ID and opens at least one of its respective shutters when the selected user ID matches its stored user ID.

The signal controller may output the image signal and the timing control signal at substantially the same time. The signal controller may output a second image signal and a second timing control signal including the other user ID during a second period of the image frame period after the first period. When the first and second user IDs differ from one another, the first and second image signals may differ from one another. When the first and second user IDs are the same, the first period may be the entire image frame period.

During a period of the request signals each request signal may include a single pulse to represent its user ID, where a pulse width of the pulses differ from one another. During a period of the request signals each request signal may include a different number of pulses to respectively represent their user IDs. Each request signal may include a different bit pattern to respectively represent their user IDs.

According to an exemplary embodiment of the invention, a user controller for viewing images from a multi-view display device includes a pair of polarized glasses, first and second switching circuits, a signal transmitting unit, and a signal receiving unit. The first switching circuit is for selecting a mode indicating one of a 2D and a 3D mode. The second switching circuit is for selecting a first user identification ID. The signal transmitting unit is configured to wirelessly transmit a request signal including the user ID and a determination signal including the mode. The signal receiving unit is configured to wirelessly receive a timing control signal including a second user ID. The signal receiving unit activates the glasses for viewing 2D images when the mode is 2D and the first and second user IDs match. The signal receiving unit activates the glasses for viewing 3D images when the mode is 3D and the first and second user IDs match. The signal receiving unit deactivates the glasses to prevent viewing of images when the first and second users ID differ from one another. The request signal may be one of an infrared or a radio frequency signal.

DETAILED DESCRIPTION

Figure 1:
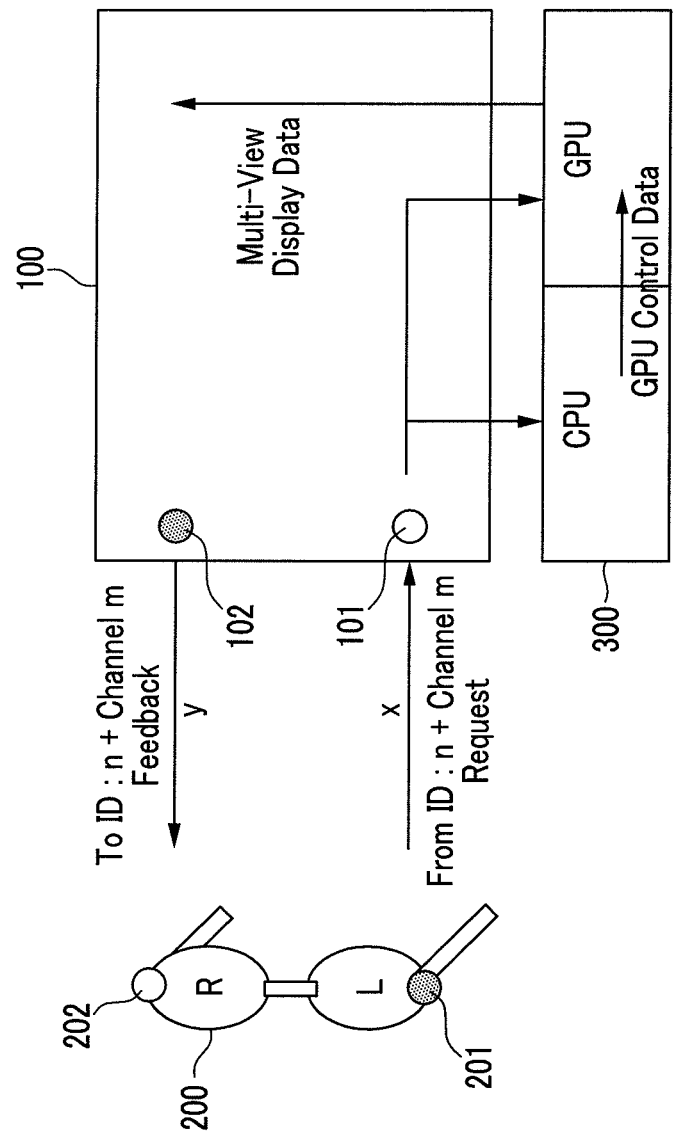
FIG. 1 is a block diagram of a first operation of a display device according to an exemplary embodiment of the present invention.

The present invention will be described more fully hereinafter with reference to the accompanying drawings, in which exemplary embodiments of the invention are shown. However, the described embodiments may be modified in various different ways, without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on"

another element, it can be directly on the other element or intervening elements may also be present.

Hereinafter, a display device according to an exemplary embodiment of the present invention is described in detail with reference to the accompanying drawings.

An operation of a display device according to an exemplary embodiment of the present invention is described with reference to FIGS. 1 and 2. FIG. 1 is a block diagram of a first operation of a display device according to an exemplary embodiment of the present invention and FIG. 2 is a block diagram of a second operation of a display device according to an exemplary embodiment of the present invention.

Figure 2:
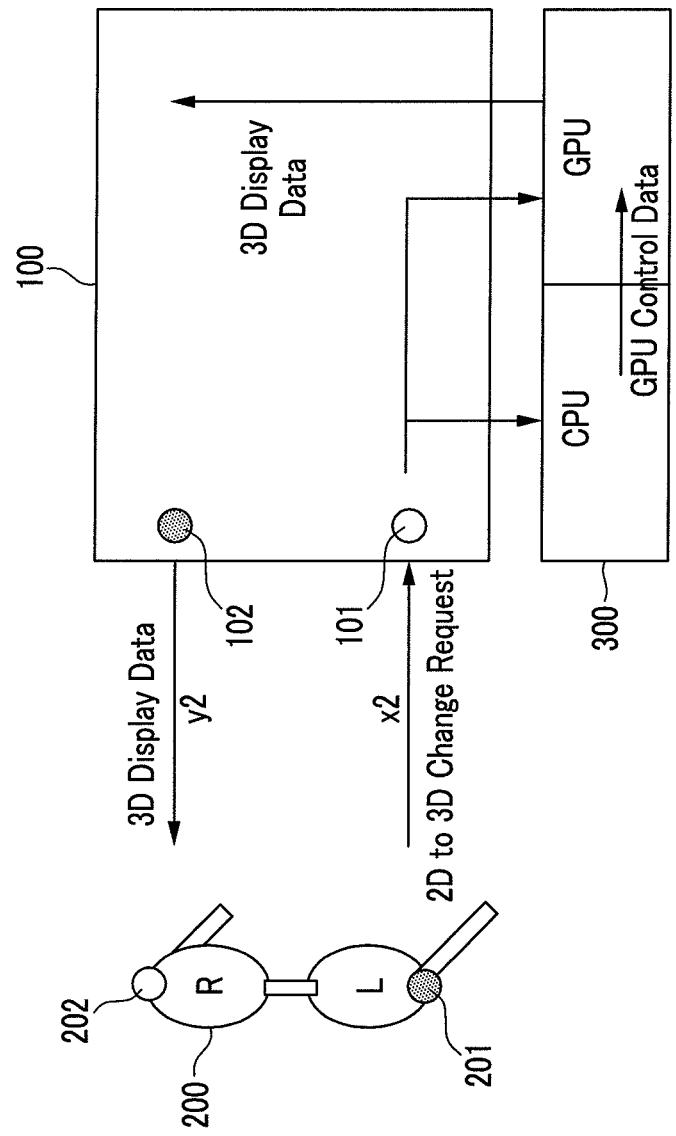
FIG. 2 is a block diagram of a second operation of a display device according to an exemplary embodiment of the present invention.

Referring to FIGS. 1 and 2, a display device according to the exemplary embodiment of the present invention includes a display panel 100, a user controller 200, and a signal controller 300. The display panel 100 includes a signal receiving unit 101 and a signal transmitting unit 102. The signal controller 300 may include a central processing unit CPU and a graphics processing unit GPU. In an alternate embodiment the signal receiving unit 101 and signal transmitting unit are located within the signal controller 300 or external from both the display panel 100 and the signal controller 300.

The display panel 100 displays a predetermined image by an image signal received from the signal controller 300. As an example, the GPU may send the image signal to the display panel 100. As an example, the display panel 100 may be a liquid crystal panel.

The user controller 200 maintains a user ID and has a user signal transmitting unit 201 and a user signal receiving unit 202. As an example, the user controller 200 may include polarized glasses.

The signal controller 300 transfers the image signal for displaying an image to the display panel 100 according to a signal received from the user controller 200.

Next, an operation of a display device according to an exemplary embodiment of the present invention is described with reference to FIG. 1.

Referring to FIG. 1, the user controller 200 transmits a user information signal x through the user signal transmitting unit 201 to the display panel 100. The user information signal x includes channel information for displaying a desired image. The channel information may include user ID information. The user ID information may uniquely identify one user controller 200 from other user controllers 200. For example, the user IDs among several user controllers 200 may differ from one another. The signal receiving unit 101 of the display panel 100 receives the user information signal x from the user signal transmitting unit 201 of the user controller 200 and transfers the user information signal x to the signal controller 300. After receiving the user information signal x, the signal controller 300 transfers an image signal to the display panel 100 to display a predetermined image at a predetermined time according to the user ID of the signal x and transmits a timing control signal y to operate the polarized glasses of the user controller 200 at the time when the image is displayed to the user controller 200 through the signal transmitting unit 102 of the display panel 100. After receiving the timing control signal y from the signal transmitting unit 102 of the display panel 100, the user controller 200 receives the image at the time determined by the signal control unit 300. During the rest of the time, the user controller 200 does not receive other images.

For example, as discussed above, several user controllers 200 may be present, each with their own unique user ID. All of the user controllers 200 may receive the same timing control signal y from the signal transmitting unit 102 of the display panel. The timing control signal y includes the user ID of one or more of the user controllers 200 that is/are destined to view the displayed image. The user controllers 200 having internal user IDs that match the received user ID(s) can enable their respective glasses to view the displayed image. The user controllers 200 having user IDs that do not match the received user ID(s) can disable their respective glasses to prevent viewing of the displayed image. The user controllers 200 may include memory (not shown) to store their internal user IDs and comparator logic (not shown) to compare their internal user IDs against the received user IDs.

Next, a second operation of a display device according to an exemplary embodiment of the present invention is described with reference to FIG. 2.

Referring to FIG. 2, the user controller 200 transmits an image determining signal x2 to the display panel 100 through the user signal transmitting unit 201. The image determining signal x2 indicates a request for either 2D or 3D images. The user controller 200 may include a selection circuit (not shown) that enables a user (e.g., through a button press) to select between viewing of 2D and 3D images. For example, the user controller 200 can format the image determining signal x2 based on a setting of the selection circuit. The signal receiving unit 101 of the display panel 100 receives the image determining signal x2 from the user signal transmitting unit 201 of the user control unit 202 and transfers the image determining signal x2 to the signal controller 300. After receiving the image determining signal x2, the signal controller 300 controls the display panel 100 to display a 2D image or a 3D image depending on the received image determining signal x2 and transmits a timing control signal y2 to operate the user's polarized glasses at the time when the image is displayed to the user controller 200 through the signal transmitting unit 102 of the display panel 100. After receiving the timing control signal y2 from the signal transmitting unit 102 of the display panel 100, the user controller 200 receives the image at the time determined by the signal controller 300. During the rest of the time, the user controller 200 does not receive other images.

For example, all of the user controllers 200 may be set to view 2D images, all of the user controllers 200 may be set to view 3D images, or one or more of the user controllers 200 may be set to view 2D images while the others are set to view 3D images. The timing controller signal y2 may include one or more user IDs. If the display panel 100 had received a request for 3D images from one of the controllers 200, the user controllers 200 having one of those matching user IDs that are configured to view 3D images can enable their respective polarized glasses to perceive the currently displayed image as 3D. If the display panel 100 had received a request for 2D images, the user controllers 200 having one of those matching user IDs that are configured to view 2D images can enable their respective polarized glasses to perceive the currently displayed image as 2D. The user controllers 200 without matching user IDs can disable their respective glasses to prevent viewing of the image.

The first and second operations of the display device described above may be performed simultaneously. Therefore, when several users (e.g., several user controllers 200) share one display panel 100, a control signal requesting individual user ID information and image information through the user controller 200 is transferred to the signal controller 300 through the display panel 100 to receive the determined information at the predetermined time, such that a plurality of users can watch only the desired images.

As an example, each control signal described above may be an infrared (IR) signal or a radio frequency (RF) signal. When the control signals are IR signals, transmission times of the control signals may be different from each other, such that the control signals do not overlap with one another. The IR control signals may be within the same wavelength range.

Next, a method of displaying several images of a display device according to an exemplary embodiment of the present invention is described with reference to FIG. 1 to FIG. 3.

Figure 3:
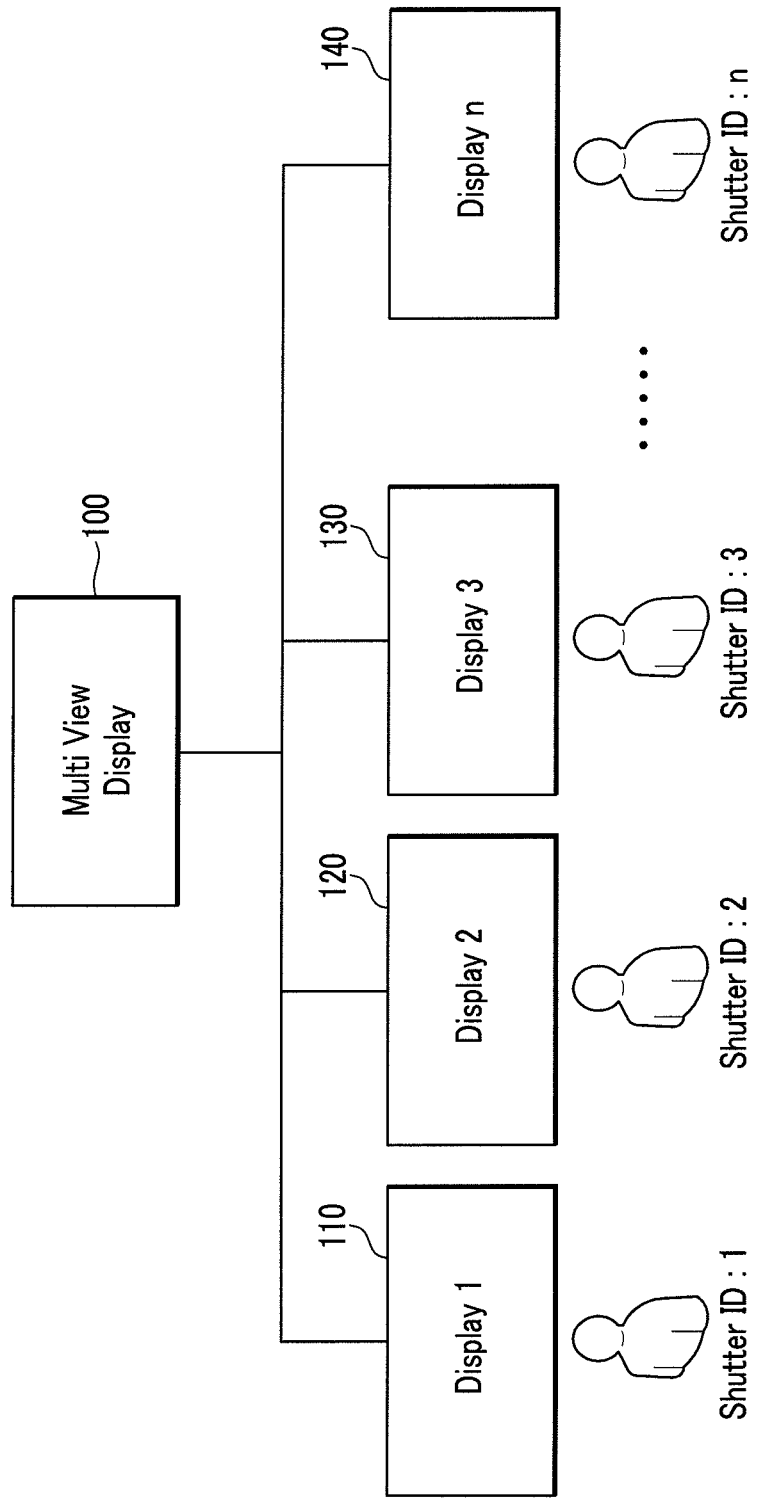
FIG. 3 is a schematic view illustrating a display method of a display device according to an exemplary embodiment of the present invention.

Referring to FIG. 1 to FIG. 3, a display device according to an exemplary embodiment of the present invention can display different images to a plurality of users. For example, n user controllers 200 may be present, where a first user controller 200 includes a first user ID: 1, a second user controller 200 includes a second user ID: 2, a third user controller 200 includes a third user ID: 3, and an n-th user controller 200 includes an n-th user ID: n. The first user controller 200 may watch a first image 110, the second user controller 200 may watch a second image 120, the third user controller 200 may watch a third image 130, and the n-th user controller may watch an n-th image 140. The user IDs:1-n may be unique from one another. Each of the user controllers 200 can transmit user ID information, channel information for displaying the desired image, the user information signal x, and the image determining signal x2 including whether the image is a 2D image or a 3D image, to the display panel 100 through its user signal transmitting unit 201 as shown in FIGS. 1 and 2, and the signal controller 300 displays the first to n-th images 110 to 140 according to each user controller 200 signal. Further, at the same time, through the user signal receiving unit 202 of each user controller 200, the timing control signal y is transmitted to operate each user's polarized glasses only at the time when each user's desired image is displayed, to the user controller 200 through the signal transmitting unit 102 of the display panel 100. As a result, each user can watch only the predetermined image at the predetermined time.

Next, methods of displaying a plurality of images of a display device according to exemplary embodiments of the present invention are described in detail with reference to FIGS. 3 to 8. FIGS. 4 to 8 are diagrams illustrating examples of a control signal used in display methods of a display device according to exemplary embodiments of the present invention.

A method of displaying a plurality of images of a display device according to an exemplary embodiment of the present invention is described with reference to FIG. 3 in addition to FIGS. 1 and 2.

Figure 4:
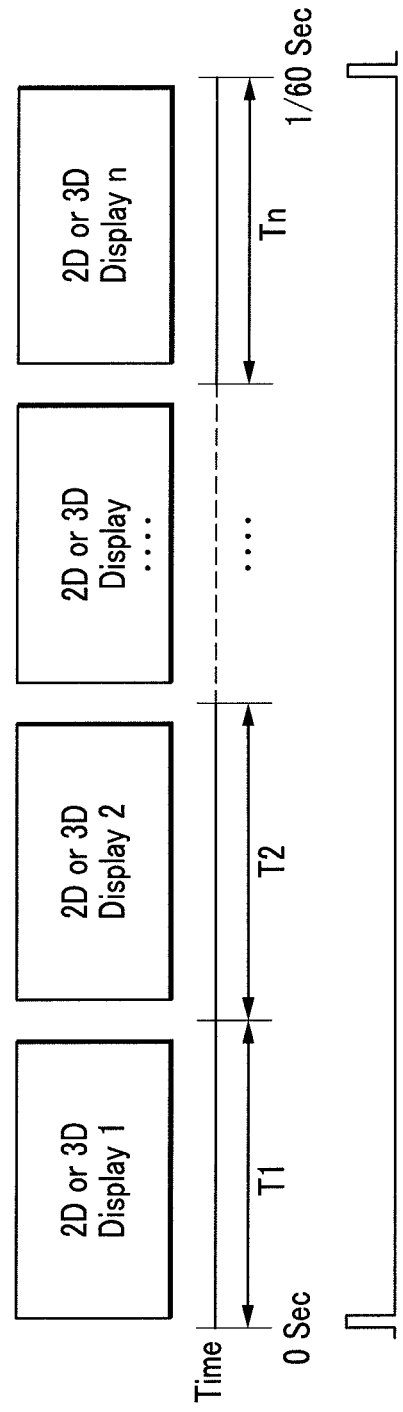
FIG. 4 is a diagram illustrating an example of a control signal used in a display method of a display device according to an exemplary embodiment of the present invention.

Referring to FIGS. 3 and 4, a display device according to an exemplary embodiment of the present invention displays the first image 110 for a first period T1 of one frame, the second image 120 for a second period T2, and the n-th image 140 for an n-th period Tn. The user controller 200 including the first user ID: 1 is controlled to watch the first image 110 during only the first time period T1. The user controller 200 including the second user ID: 2 is controlled to watch the second image 120 only during the second period T2. The user controller 200 having the n-th user ID: n is controlled to watch the n-th image 140 only during the n-th time Tn. As such, a display device according to the present exemplary embodiment displays a plurality of images watched by a plurality of users for one frame and controls each of the user controllers 200 to watch their image only at the time when that image is displayed, thereby enabling the plurality of users to individually watch distinct images by using one display panel.

Figure 5:
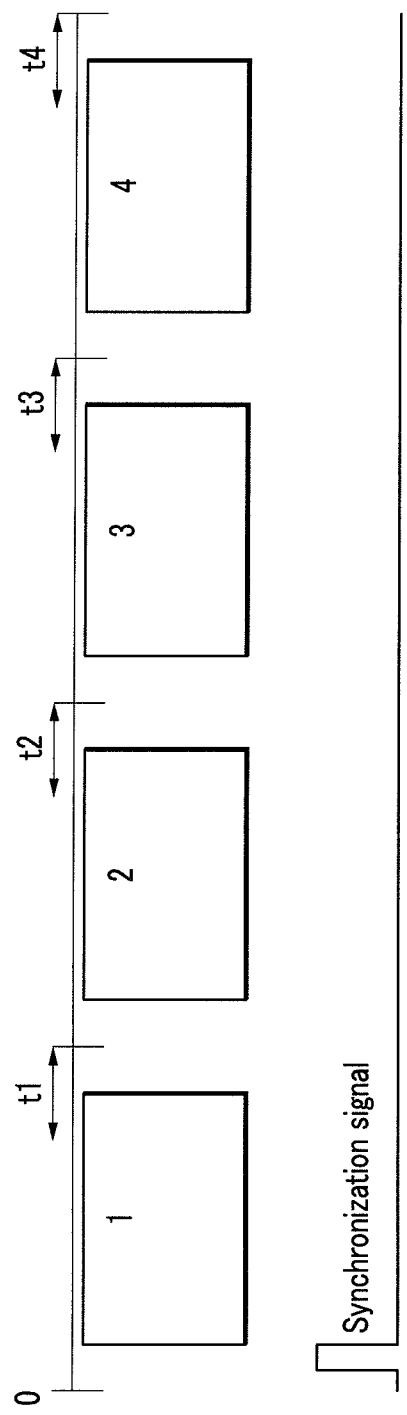
FIG. 5 is a diagram illustrating another example of a control signal used in a display method of a display device according to an exemplary embodiment of the present invention.

Next, referring to FIGS. 3 and 5, a method of displaying a plurality of images of a display device according to an exemplary embodiment is similar to the method described with respect to FIG. 4. However, each user may control their respective user controller 200 to stop watching the image in advance between times of displaying the images to prevent the image from overlapping with the images watched by the other users. For example, a user with a user controller 200 having the first user ID: 1 watches the first image 110 during part of the first period T1 and stops watching the image at the time t1 before the end of the first period T1. Similarly, a user with a user controller 200 having the second user ID: 2 watches the second image 120 for part of the second period T2 and stops watching the image at the time t2 before the end of the second period T2. Accordingly, it may be possible to prevent the image watched by each user from overlapping with the image of a user having the next ID.

Figure 6:
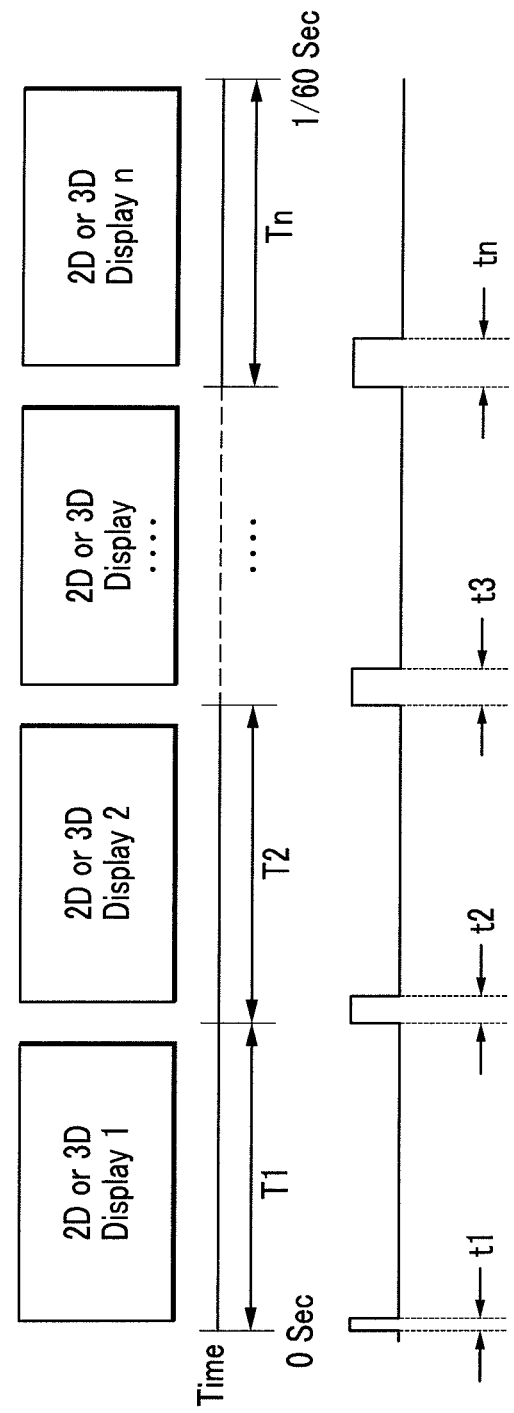
FIG. 6 is a diagram illustrating another example of a control signal used in a display method of a display device according to an exemplary embodiment of the present invention.

Next, referring to FIG. 3 and FIG. 6, unlike the image displaying methods described with respect to FIGS. 4 and 5, a method of displaying a plurality of images of a display device according to an exemplary embodiment does not display images for each user ID in sequence but determines the user ID of a user controller 200 by using the length of the signal that the user controller 200 transmits through its user signal transmitting unit 201. For example, when a transmission time (e.g., pulse width) of the signal transmitted by the user controller 200 through its user signal transmitting unit 201 is t1, the signal controller 300 recognizes the user controller 200 as having the first user ID: 1 to display the first image 110 and control the user controller having the first user ID: 1 to watch the image at substantially the same time or simultaneously. When a transmission time of the signal (e.g., pulse width) transmitted by the user controller 200 through its user signal transmitting unit 201 is t2, the signal controller 300 recognizes the user controller 200 as having the second user ID: 2 to display the second image 120 and control the user controller 200 having the second user ID: 2 to watch the image at substantially the same time or simultaneously. Similarly, when a transmission time (e.g., pulse width) of the signal transmitted by the user controller 200 through its user signal transmitting unit 201 is tn, the signal controller 300 recognizes the user controller 200 as having the n-th user ID: n to display the n-th image 140 and control the user controller 200 having the n-th user ID: n to watch the image at substantially the same time or simultaneously. As such, the signal controller 300 can discriminate between the user IDs of each user controller 200 depending on the transmission time (e.g., pulse width) of the signal transmitted by the user controller 200 through its user signal transmitting unit 201. In this way, display of unnecessary images can be eliminated. For example, if three user controllers 200 exist, but only the first two are being actively used, the signal controller 300 would only display images for the first two user controllers 200. For example, if the third user controller 200 having user ID: 3 is not being actively used, the signal controller 300 will not receive a signal with a pulse width that corresponds to the third user controller 200 (see e.g., t3 in FIG. 6). Thus, the signal controller 300 need not display the third image 130. Since display of unnecessary images can be avoided, power consumption may be reduced.

Figure 7:
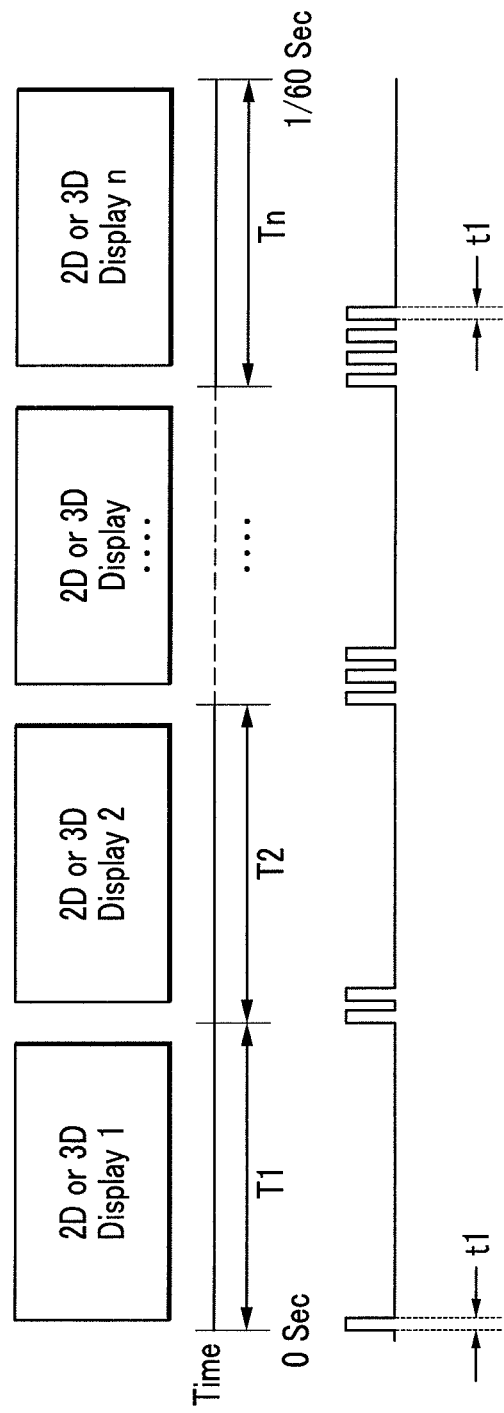
FIG. 7 is a diagram illustrating another example of a control signal used in a display method of a display device according to an exemplary embodiment of the present invention.

Next, referring to FIG. 7 in addition to FIG. 3, unlike the image displaying methods according to the exemplary embodiments described with respect to FIGS. 4 and 5, a method of displaying a plurality of images of a display device according to an exemplary embodiment does not display images for each user ID in sequence but determines the user ID of a user controller 200 by using a pulse count of the signal that the user controller 200 transmits through its user signal transmitting unit 201. For example, when the signal transmitted by the user controller 200 through its user signal transmitting unit 201 is received by the signal controller 300 with a single pulse, the signal controller 300 recognizes the user controller 200 as having the first user ID: 1 to display the first image 110 and control the controller 200 having the first user ID: 1 to watch the image at substantially the same time or simultaneously. When the signal transmitted by the user controller 200 through its user signal transmitting unit 201 is received by the signal controller 300 with two pulses, the signal controller 300 recognizes the user controller 200 as having the second user ID: 2 to display the second image 120 and control the user controller 200 having the second user ID: 2 to watch the image at substantially the same time or simultaneously. Similarly, when the signal transmitted by the user controller 200 through its user signal transmitting unit 201 is received by the signal controller 300 with n pulses, the signal controller 300 recognizes the user controller 200 as having the n-th user ID: n to display the n-th image 140 and control the user controller 200 having the n-th user ID: n to watch the image at substantially the same time or simultaneously. As such, the signal controller 300 can discriminate between the user ID of each user controller 200 depending on the number of pulses transmitted by the user controller 200 during a given period through its user signal transmitting unit 201. In this way, display of unnecessary images can be eliminated. For example, if three user controllers 200 exist, but only the first two are being actively used, the signal controller 300 would only display images for the first two user controllers 200. For example, if the third user controller 200 having user ID: 3 is not being actively used, the signal controller 300 will not receive a signal with three pulses that corresponds to the third user controller 200. Thus, the signal controller 300 need not display the third image 130. Since display of unnecessary images can be avoided, power consumption can be reduced.

While the above described user controllers 200 sending out a number of pulses corresponding to the number of the controller (e.g., 1 for the first, 2 for the second, etc.), embodiments of the invention are not limited thereto. For example, the number of pulses used to identify a particular user controller 200 may vary considerably. The signal controller 300 may include pulse count logic to count the number of pulses during a given period. The signal controller 300 may include memory to store the given period and a table (e.g., a look up table) that links the counted number of pulses to the respective user ID of a user controller 200.

Figure 8:
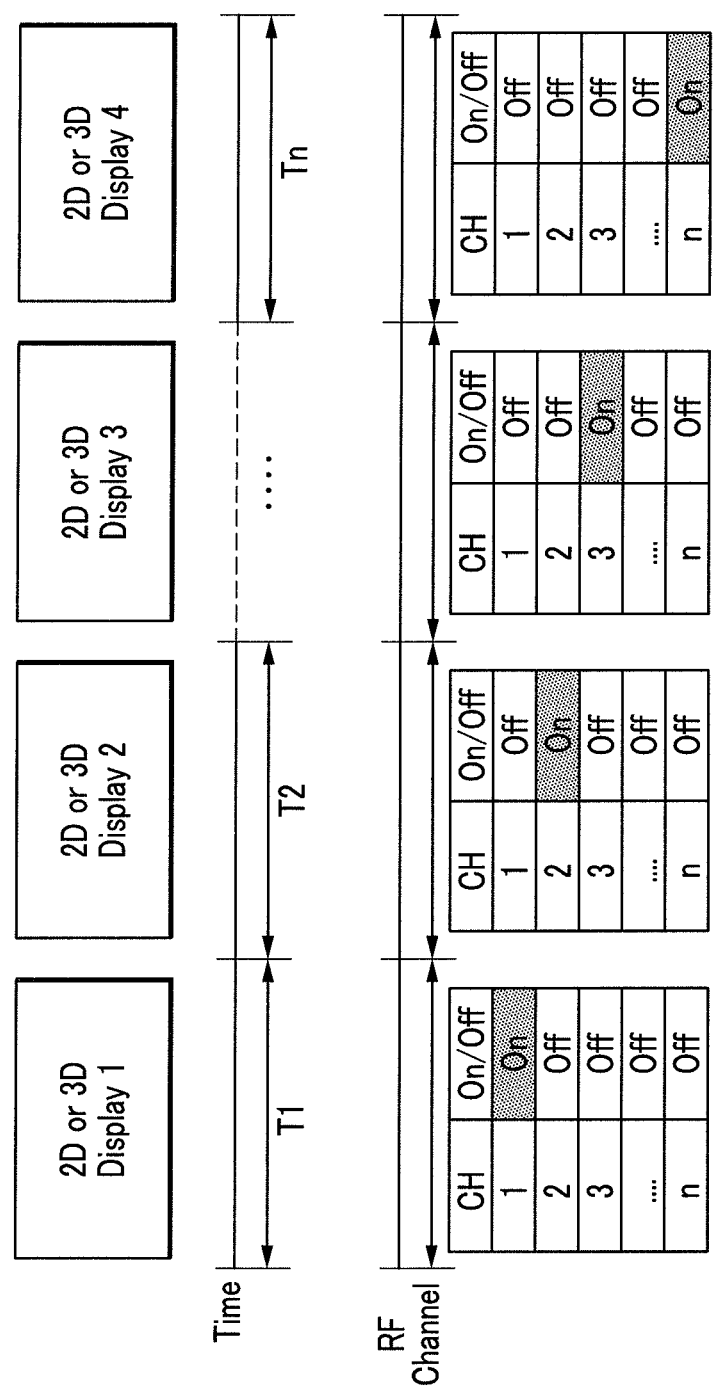
FIG. 8 is a diagram illustrating another example of a control signal used in a display method of a display device according to an exemplary embodiment of the present invention.

Next, referring to FIG. 8 in addition to FIG. 3, unlike the image displaying methods according to the exemplary embodiments described with respect to FIGS. 4 and 5, a method of displaying a plurality of images of a display device according to an exemplary embodiment does not display images for each user ID in sequence but determines the user ID for a user controller 200 by recognizing a bit pattern of the signal transmitted by its user controller 200. For example, the signal transmitted through the user signal transmitting unit 201 may be a binary signal with one or more bits set to various states. For example, when a first channel signal of the signal transmitted by the user controller 200 through its user signal transmitting unit 201 is turned on and the other channel signals of the signal are turned off (e.g., signal is set to a bit pattern of 100), the signal controller 300 recognizes the user controller 200 as having the first user ID: 1 to display the first image 100 and control the user controller 200 having the first user ID: 1 to watch the image at substantially the same time or simultaneously. When a second channel signal of the signal transmitted by the user controller 200 through its user signal transmitting unit 201 is turned on and the other channel signals are turned off (e.g., signal is set to a bit pattern of 010), the signal controller 300 recognizes the user controller 200 as having the second user ID: 2 to display the second image 120 and control the user controller 200 having the second user ID: 2 to watch the image at substantially the same time or simultaneously. Similarly, when a n-th channel signal of the signal transmitted by its user controller 200 through its user signal transmitting unit 201 is turned on and the other channel signals are turned off, the signal controller 300 recognizes the user controller as having the n-th user ID: n to display the n-th image 140 and control the n-th user ID: n to watch the image at substantially the same time or simultaneously. As such, the signal controller 300 can discriminate between the user ID of each user controller depending on the binary signal transmitted by the user controller 200 through its user signal transmitting unit 201. In this way, display of unnecessary images can be eliminated. For example, if three user controllers 200 exist, but only the first two are being actively used, the signal controller 300 would only display images for the first two user controllers 200. For example, if the third user controller 200 having user ID: 3 is not being actively used, the third channel signal would always be turned off in the binary signal received by signal controller 300 signal. Thus, the signal controller 300 need not display the third image 130. Since display of unnecessary images can be avoided, power consumption can be reduced.

Next, user controllers 200 having different user IDs are described with reference to FIGS. 9A and 9B in addition to FIGS. 1 and 2. A switching method of a display device according to an exemplary embodiment of the present invention will be described below with reference to FIGS. 9A and 9B in addition to FIGS. 1 and 2.

Figure 9A:
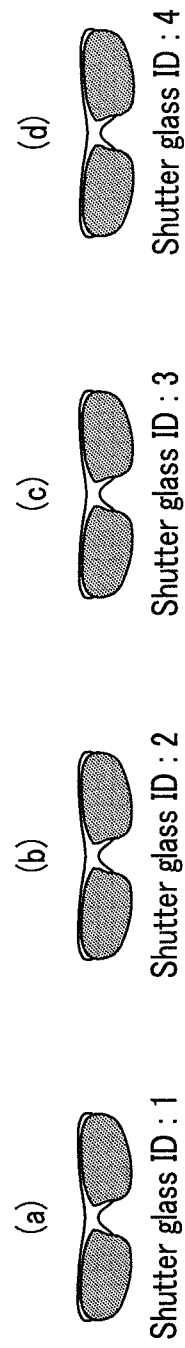
FIGS. 9A and 9B are diagrams illustrating an example of a switching method of a display device according to an exemplary embodiment of the present invention.

Referring to FIG. 9A in addition to FIGS. 1 and 2, several user controllers 200 having different user IDs are present. The user IDs may also be referred to as Shutter IDs or Shutter Glass IDs. Each user controller 200 may include polarized glasses. Each of the user controllers 200 is controlled to watch an image only while image information of a specific ID is displayed. For example, the user controllers 200 may be controlled by timing control signals sent by the signal controller 300 to open at least one shutter of its glasses to enable watching of the image or to close both shutters to prevent watch watching of the image.

Figure 9B:
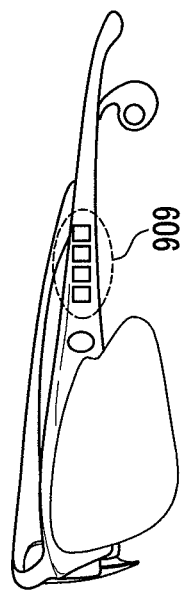

Next, referring to FIG. 9B in addition to FIGS. 1 and 2, a user controller 200 includes a switching circuit 909. Each user controller 200 transmits a control signal x including his user ID information to a signal receiving unit 101 of a display panel 100 by using the switch 909 circuit. For example, the switching circuit 909 may include one or more buttons that are set to format the user ID that is included in the signal x. For example, the buttons can be configured such that only one can be depressed at a time such that the number of controllers 200 supported corresponds to the number of buttons available (e.g., user IDs 1-4). In another example, any combination of the buttons can be depressed such that the number of controllers supported corresponds to 2 raised to the number of buttons available (e.g., user IDs 1-16). The switching circuit 909 may be located internally within the user controller 200 and preset to a particular user ID to prevent a casual user from changing the user ID. In another embodiment, the switching circuit 909 or a second such circuit can be used to select between one of 2D and 3D modes.

As such, the user controller 200 of the display device according to an exemplary embodiment of the present invention may be assigned with a specific ID according to the number of users or assigned with a plurality of IDs by changing each ID by using the switching circuit.

A user may be assigned to each user controller 200. By adjusting the switching circuit 909 on their assigned user controller 200 they can select a channel that displays a desired image through a unique ID assigned by the switch. Through the assigned ID, the controller 200 is controlled to watch the image only while the image of the channel displaying the desired image is displayed. Therefore, a plurality of users can watch their desired images by using one display panel.

If all users adjust their user controllers 200 to the same ID, the same channel is selected. Thus, the signal controller 300 need only display a single image on the display panel 100.

When the number of channels of individual images which the display panel can display for one frame is n, an n+1-th user controller 200 can select and watch any one of the first to n-th images and cannot watch the other images. Further, when the user controller 200 having any one of the first to n-th IDs stops watching the image, the n+1-th user controller 200 may be assigned with the ID of a user who stops watching the image.

Figure 10:
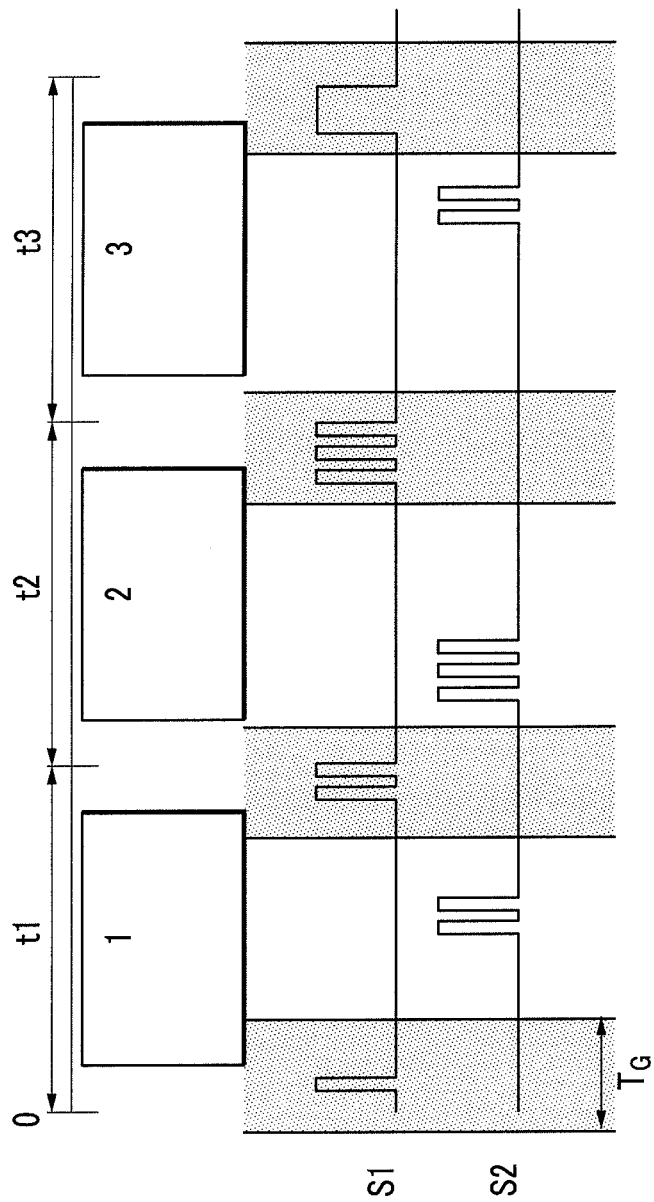
FIG. 10 is a diagram illustrating another example of a control signal used in a display method of a display device according to an exemplary embodiment of the present invention.

Next, a display method of a display device according to an exemplary embodiment of the present invention is described with reference to FIG. 10 in addition to FIGS. 1 and 2. FIG. 10 is a diagram illustrating another example of a control signal used in a display method of a display device according to an exemplary embodiment of the present invention.

Referring to FIG. 10, when a control signal transmitted from the signal transmitting unit 102 of the display panel 100 and a control signal transmitted from the user signal transmitting unit 201 of its user controller 200 use the same wavelength range, a transmission time of the control signal S1 transmitted from the signal transmitting unit 102 of the display panel 100 may be set to be different from a transmission time of the control signal S2 transmitted from the user signal transmitting unit 201 of the user controller 200, thereby preventing the signals from overlapping with each other. For example, by lengthening a time interval to be larger than the time interval Tg for preventing overlapping with a signal of an adjacent ID, it is possible to prevent overlapping with the signal of the adjacent ID and each of the control signals.

Figure 11:
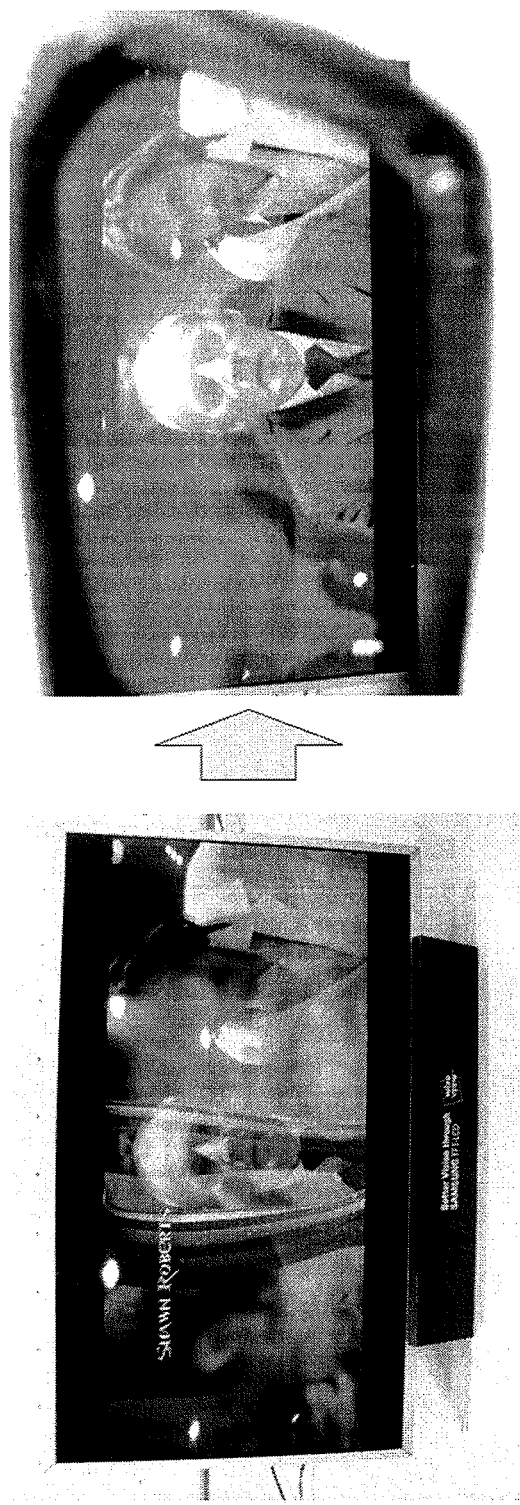
FIGS. 11 to 13 are diagrams illustrating examples of screen captures of a display device according to an exemplary embodiment of the present invention.
Figure 12:
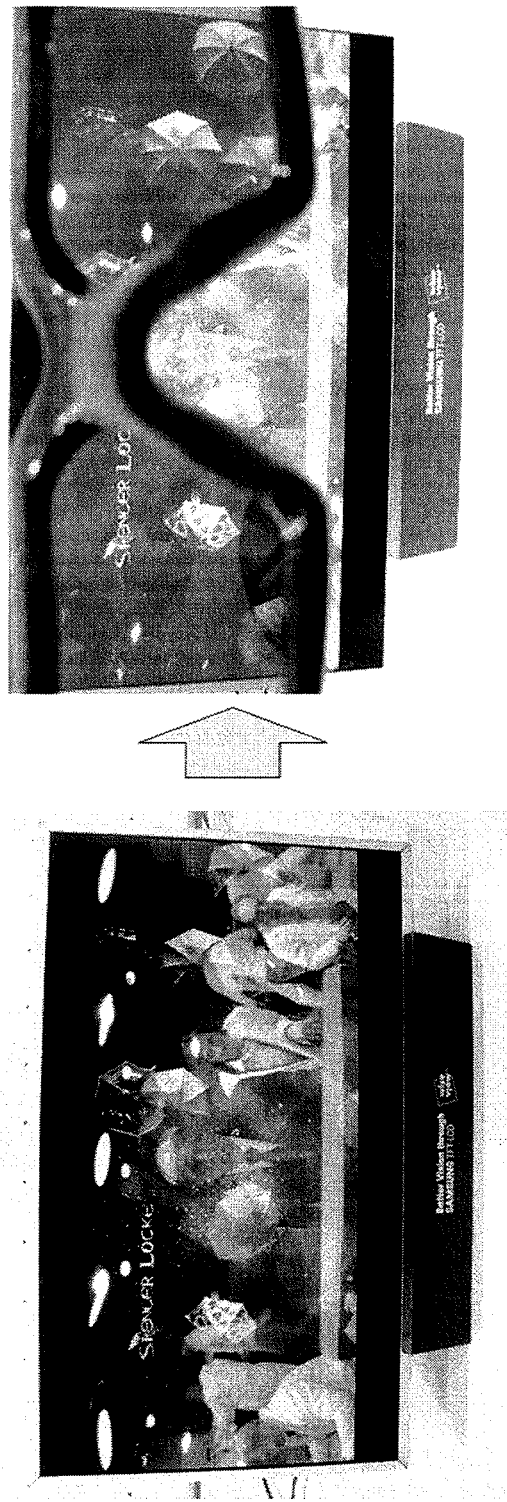
Figure 13:
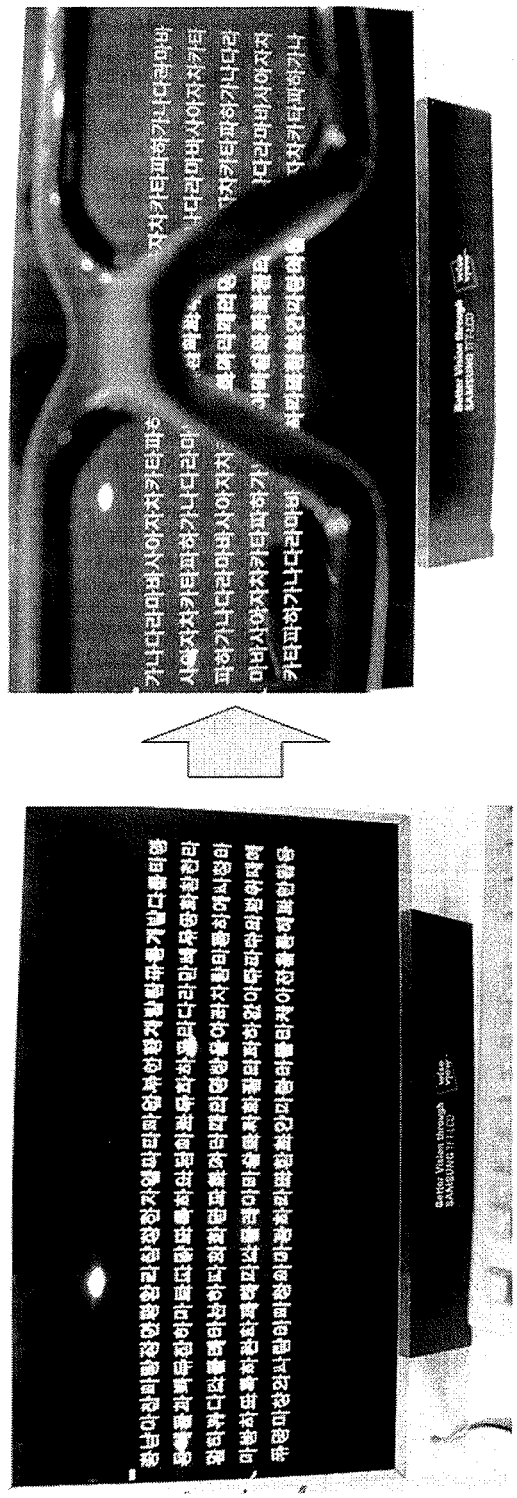

Next, exemplary images that may be displayed by a display device according to an exemplary embodiment of the present invention are described with reference to FIGS. 11 to 13. FIGS. 11 to 13 are diagrams illustrating exemplary screen captures of a display of a display device according to an exemplary embodiment of the present invention.

Referring to FIGS. 11 to 13, by watching a left image of time-divisionally displayed several images for one frame only for the predetermined time according to each user ID, each user can watch only his desired image like a right image.

As described above, a display device according to an exemplary embodiment of the present invention assigns user IDs to each user controller 200, distinguishes the user controllers 200 from one another using the user IDs, displays images at different times according to the user IDs, and operates the polarized glasses of the user controllers 200 according to the user IDs by using one display panel. In this way, a plurality of users can watch different desired images by using one display device. Further, with this arrangement, a user controller 200 can be prevented from watching the images watched by another user controller to protect privacy.

While the invention has been described in connection with exemplary embodiments thereof, it is to be understood that the invention is not limited to the disclosed embodiments, but, on the contrary, is intended to cover various modifications and equivalent arrangements included within the spirit and scope of the disclosure.

What is claimed is:

1. A multi-view display device, comprising:
a display panel configured to display images based on received image signals;
a signal receiving unit configured to receive request signals including channel information;
a signal transmitting unit configured to transmit timing control signals;
a signal controller configured to receive the request signals from the signal receiving unit and output the image signals to the display panel,
wherein when the signal controller receives at least two of the request signals with distinct channel information during a given period, the signal controller:
outputs a first image signal to the display panel for view by a first user controller and a first timing control signal to the signal transmitting unit that includes one of the distinct channel information during a first period of an image frame; and
outputs a second image signal to the display panel for view by a second user controller and a second timing control signal to the signal transmitting unit that includes the other of the distinct channel information during another second period of the image frame,
wherein the first user controller is configured to enable a user to stop watching before the end of the first period of the image frame and the second user controller is configured to enable a user to stop watching before the end of the second period of the image period.

2. The multi-view display device of claim 1, further comprising the user controllers, each user controller comprising:
polarized glasses;
a second signal transmitter to transmit one of the at least two request signals; and
a second signal receiver configured to receive the timing control signals,
wherein the corresponding user controller is configured to activate the polarized glasses during one of the two periods to view the display panel and deactivate the polarized glasses to prevent viewing of the display panel during the other period based on the received timing control signals.

3. The multi-view display device of claim 2, wherein the channel information is identification ID information that distinguishes the user controls from one another.

4. The multi-view display device of claim 3, wherein the ID information of the first user controller is a first pulse width in the request signal from the first user controller, wherein the ID information of the second user controller is a second pulse width in the request signal from the second user controller, and the first and second pulse widths differ from one another.

5. The multi-view display device of claim 3, wherein the ID information of the first user controller is a first number of pulses in the request signal from the first user controller, wherein the ID information of the second user controller is a second number of pulses in the request signal from the second user controller, and the first and second numbers differ from one another.

6. The multi-view display device of claim 3, wherein the ID information of the first user controller is a first bit pattern in the request signal from the first user controller, wherein the ID information of the second controller is a second bit pattern in the request signal from the second user controller, and the first and second bit patterns differ from one another.

7. The multi-view display device of claim 3, wherein each user controller comprises a switching circuit and a setting of each switching circuit corresponds to the respective ID information.

8. The multi-view display device of claim 7, wherein each switching circuit includes a number of selectable buttons, and the selections of the buttons correspond to the respective ID information.

9. The multi-view display device of claim 2, wherein each user controller is configured to send a determination signal through the second signal transmitting unit that indicates a request for one of a 2D image and a 3D image.

10. The multi-view display device of claim 2, wherein the signal receiving unit receives the determination signal and forwards the determination signal to the signal controller.

11. The multi-view display device of claim 10, wherein the signal controller formats the image signals sent to the display panel as 2D image signals when the received determination signal indicates a request for a 2D image and formats the images signals as 3D images when the received determination signal indicates a request for a 3D image.

12. The multi-view display device of claim 1, wherein the signal receiving unit and the signal transmitting unit are both located within the display panel.

* * * * *